(12) United States Patent
Avdjian et al.

(10) Patent No.: US 10,094,483 B2
(45) Date of Patent: *Oct. 9, 2018

(54) NOZZLE CHECK VALVE (71) Applicant: Cameron International Corporation, Houston, TX (US)

(72) Inventors: Christophe Avdjian, Meyreuil (FR); Michael G. Dempster, Cypress, TX (US)

(73) Assignee: Cameron International Corporation, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/723,446

(22) Filed: May 27, 2015

(65) Prior Publication Data

US 2015/0267823 A1    Sep. 24, 2015

Related U.S. Application Data (63) Continuation of application No. 13/499,283, filed as application No. PCT/US2011/033128 on Apr. 19, 2011, now Pat. No. 9,169,937.

(30) Foreign Application Priority Data

Jul. 8, 2010 (EP) .................................... 10305761

(51) Int. Cl.
*F16K 15/02*    (2006.01)

(52) U.S. Cl.
CPC ....... *F16K 15/028* (2013.01); *Y10T 137/7837* (2015.04)

(58) Field of Classification Search
CPC ............. F16K 15/028; Y10T 137/7837; Y10T 137/786; Y10T 137/7861; Y10T 137/7935
See application file for complete search history.

(56) References Cited

U.S. PATENT DOCUMENTS

| 190,469 A | 5/1877 | Corliss |
| 795,999 A | 8/1905 | Mueller |

(Continued)

FOREIGN PATENT DOCUMENTS

| DE | 1550254 | 7/1969 |
| DE | 3143028 A1 | 5/1983 |

(Continued)

OTHER PUBLICATIONS

Valve User Magazine, Issue 12, Winter 2009, p. 48.*

(Continued)

*Primary Examiner* — Craig Schneider
*Assistant Examiner* — Frederick D Soski
(74) *Attorney, Agent, or Firm* — Fletcher Yoder, P.C.

(57) ABSTRACT

The disclosed embodiments include check valves capable of improved dynamic performance (e.g., closing and opening times). The check valves may include an annular disc having an opening. The annular disc may be lightweight and present a reduced surface area to the flow, thus increasing the closure speed of the check valve as well as the opening speed of the check valve. Other components, such as a spacer component, may be reconfigured to modify the check valve for increased performance in a variety of applications, including low flow volume, medium flow volume, and high flow volume applications.

18 Claims, 6 Drawing Sheets

(56) References Cited

U.S. PATENT DOCUMENTS

| | | | | |
|---|---|---|---|---|
| 921,892 | A | * | 5/1909 | Rogler .................... F16K 15/10 137/516.13 |
| 1,331,504 | A | | 2/1920 | Hewitt |
| 1,354,318 | A | * | 9/1920 | Longacre ................ F16K 15/12 137/516.21 |
| 1,450,135 | A | | 3/1923 | Clark |
| 1,690,836 | A | * | 11/1928 | Redfield ................. F16K 15/12 137/516.19 |
| 1,856,617 | A | * | 5/1932 | Bebbington ............ F16K 15/12 137/516.19 |
| 1,909,974 | A | * | 5/1933 | Longacre ................ F16K 15/10 137/514.3 |
| 1,971,171 | A | * | 8/1934 | Bebbington ............ F16K 15/10 137/516.13 |
| 2,090,486 | A | * | 8/1937 | Richardson ......... F04B 39/1033 137/516.21 |
| 2,639,726 | A | * | 5/1953 | Golob ................ G05D 16/0619 137/493 |
| 3,119,410 | A | | 1/1964 | Noecker |
| 3,993,093 | A | | 11/1976 | Mokveld |
| 4,437,492 | A | | 3/1984 | Taylor |
| 4,705,068 | A | * | 11/1987 | Hartshorn ........... F04B 39/1053 137/512.1 |
| 4,766,929 | A | | 8/1988 | Yaindl |
| 4,971,101 | A | | 11/1990 | Becker et al. |
| 6,443,183 | B1 | | 9/2002 | Roorda |
| 2002/0005217 | A1 | | 1/2002 | Lyons |
| 2008/0149194 | A1 | * | 6/2008 | Spiegl ................ F04B 39/1033 137/516.21 |
| 2008/0149196 | A1 | * | 6/2008 | Spiegl ................ F04B 39/1033 137/543.15 |
| 2008/0185055 | A1 | * | 8/2008 | Niedermair ........... F16K 15/028 137/540 |

FOREIGN PATENT DOCUMENTS

| | | |
|---|---|---|
| DE | 19620140 A1 | 11/1997 |
| DE | 20200792 U1 | 4/2002 |
| DE | 20214781 U1 | 11/2002 |
| DE | 102005009989 B3 | 6/2006 |
| EP | 1329658 A1 | 7/2003 |
| FR | 2559872 A1 | 8/1985 |
| WO | WO8505409 A1 | 12/1985 |

OTHER PUBLICATIONS

Goodwin-NoReVa Nozzle Check Valves Brochure, all pages, having a document creation date of Jul. 11, 2007 and at least available on the internet Dec. 5, 2008.*
PCT International Search Report and Written Opinion; Application No. PCT/US2011/033128; dated Jun. 10, 2011; 14 pages.
Extended European Search Report; Application No. EP 10305761.8; dated Dec. 21, 2010; 6 pages.
Communication Pursuant to Article 94(3) EPC; Application No. EP 10305761.8; dated Aug. 8, 2012; 4 pages.
Communication Pursuant to Article 94(3) EPC; Application No. EP 10305761.8; dated Mar. 22, 2013; 4 pages.
EP Communication of a Notice of Opposition; Application No. EP 10305761.8; dated Feb. 10, 2015; 6 pages.
EP Notice of Opposition of EP 10305761.8; Received Jan. 28, 2015 in EPO; 13 pages.
Declaration of Hans Gustorf, Sales Director, Noreva GmbH; Declaration in support of Opposition for EP 10305761.8; dated Jan. 22, 2015; 3 pages.
Document D6—Noreva Catalogue 2001-2004 in Support of Opposition for EP 10305761.8; Opposition dated Jan. 28, 2015; 2 pages.
Document D7—Noreva Catalogue 2005-2014 in Support of Opposition for EP 10305761.8; Opposition dated Jan. 28, 2015; 24 pages.
Document D8—Noreva NRV-R Drawings in Support of Opposition for EP 10305761.8; Opposition dated Jan. 28, 2015; 8 pages.
Document D9—Noreva General Arrangement Drawing for NRV-B in Support of Opposition for EP 10305761.8; Opposition dated Jan. 28, 2015; 1 page.
Document D10—Noreva General Arrangement Drawing for NRV-BK in Support of Opposition for EP 10305761.8; Opposition dated Jan. 28, 2015; 1 page.
Document D11—Noreva General Arrangement Drawing for NRV-G in Support of Opposition for EP 10305761.8; Opposition dated Jan. 28, 2015; 1 page.
Document D12—May 2010 Quote to Goodwin International Limited for Non-Return Valves type NRV-BZ and accompanying drawings in Support of Opposition for EP 10305761.8; Opposition dated Jan. 28, 2015; 7 pages.
Document D13—May 2010 Purchase Order for Manufacture of NRV-BZ Valve Parts and Drawings Referred to in Support of Opposition for EP 10305761.8; Opposition dated Jan. 28, 2015; 3 pages.
EP Reply to the Communication Pursuant to Rule 79(1) EPC (with EP Acknowledgement Receipt); Application No. EP10305761.8; Reply Submitted Sep. 16, 2015; 11 pages.
Canadian Office Action for CA Application No. 2,798,686 dated Dec. 8, 2017; 5 Pages.

* cited by examiner

FIG. 6

NOZZLE CHECK VALVE

CROSS REFERENCE TO RELATED APPLICATIONS

This application claims priority to and benefit of U.S. patent application Ser. No. 13/499,283, entitled "Nozzle Check Valve", filed on Mar. 29, 2012, which is herein incorporated by reference in its entirety, and which claims priority to and benefit of PCT Patent Application No. PCT/US2011/033128, entitled "Nozzle Check Valve", filed on Apr. 19, 2011, which is herein incorporated by reference in its entirety, and which claims priority to and benefit of European Patent Application No. EP10305761.8, entitled "Nozzle Check Valve", filed on Jul. 8, 2010, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Check valves are capable of protecting mechanical equipment by preventing the reversal of flow through a conduit. That is, the check valve is capable of allowing the passage of a fluid (i.e., liquid or gas) in one direction through the conduit (e.g., forward flow) and stopping the flow of the fluid through the conduit in the opposite direction (e.g., backward flow). Unfortunately, certain check valves may have a slow response time, which reduces performance or reliability of the system. Furthermore, the check valve may be subject to fatigue or failure due to repeated cycling and slamming of a moving element on a stationary element.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

The disclosed embodiments include a nozzle check valve having an annular or toroidal disc (e.g., circular disc with a hollow center) capable of improving valve closure time, reducing disc weight, decreasing valve opening and closing times, and increasing a volume of flow through the valve body. Additionally, the disclosed embodiments enables for the modular reconfiguration of valve components, such as a spacer, that renders the valve suitable for a variety of operating conditions and environments, including subsea environments. Accordingly, the valve may be delivered as a kit, including multiple components suitable for reconfiguring the valve for different applications, such as different flow applications, e.g., low flow applications, medium flow applications, and high flow applications.

Additionally, the valve may be used with piping of different sizes (e.g., between 10 in. to 20 in., 15 in. to 45 in., 35 in. to 80 in., 10 in. to 80 in. diameters) and may be used in any orientation (e.g., horizontal orientation, vertical orientation, angled orientation). Further, the nozzle check valve includes features capable of improving valve inspection and valve maintenance by enabling easy access to the valve components through the use of a removable locking mechanism. Additionally, the modular design of the check valve enables for the separation of the valve components from the valve body, which enables the valve body to be separately manufactured using techniques such as forging.

Figure 1:
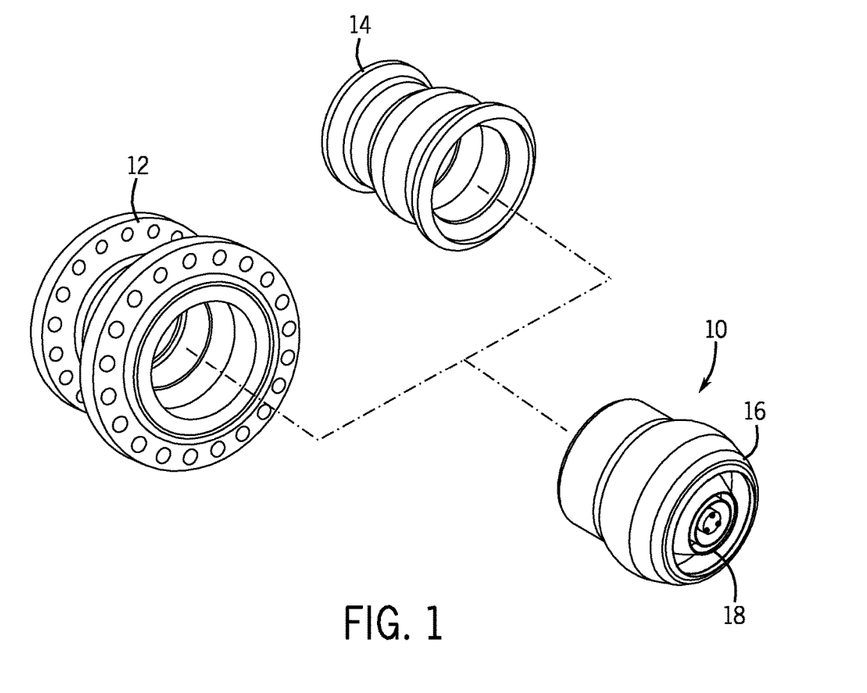
FIG. 1 is an exploded perspective view of a nozzle check valve, a flange valve body, and a weldable valve body, in accordance with one embodiment of the disclosure.

FIG. 1 is an exploded perspective view of embodiments of a nozzle check valve 10, a flanged end valve body 12, and a weld end valve body 14. In the illustrated embodiment, the nozzle check valve 10 includes a valve body 16, which may be selectively replaced with one of the bodies 12 or 14. That is, the internal components of the check valve 10 may be used in any one of the valve bodies 12, 14, and 16. Indeed, all of the valve 10 components, such as a diffuser 18, may be used interchangeably used with valve bodies 12, 14, and 16. In the figure, the diffuser 18 of the check valve 10 is shown through the rear of the valve body 16. Further, the valve 10 components may be manufactured separately from the valve bodies 12, 14, and 16 used with any number of valve bodies for improved flexibility. Such modular flexibility enables the valve 10 to be configured for a wide variety of applications. For example, the valve 10 components may be configured for a certain type of flow, including low flow applications, medium flow applications, and high flow applications, as described in more detail below.

Because of the ability to manufacture the valve body separate from the nozzle 20 and other valve 10 components, the valve body may be manufactured by using forging techniques. Forging allows an increase in strength of the valve bodies 12, 14 and 16 due to, for example, grain hardening. In other embodiments, the valve bodies 12-16 may be manufactured, by using computer numerically controlled (CNC) techniques, casting techniques, milling techniques, and so forth. The valve bodies 12-16 may be coated with an internal and/or external layer of an oxidation and corrosion resistant material such as Inconel® (e.g., austenitic nickel-chromium-based superalloy) available from Special Metals Corporation of New Hartford, N.Y., U.S.A. Other corrosion resistant materials may include stainless steel, titanium, and forth. Such coating provides enhanced component life in corrosive environments such as subsea environments. Further, the cost of manufacturing the valve bodies 12, 14 and 16 is reduced because the valve bodies may be manufactured out of a less costly material such as steel, brass, cast iron, aluminum, and so forth, and then coated with a more expensive material suitable for preventing corrosion and oxidation. Accordingly, the valve bodies 12, 14 and 16 may be manufactured and coated for certain properties, such as corrosion prevention and then the remainder of the valve 10 components may be inserted into a specific valve body.

In certain applications, such as applications specifying quick removal and replacement of a valve, the flanged end valve body 12 may be used. The flanged end valve body 12 enables easy installation and removal of the valve 10 from a conduit such as a flanged pipe. The valve 10 may be installed, for example, by using gaskets and a plurality of nuts and bolts suitable for securing the flange end valve body 12 to the conduit. In other applications, such as subsea manifold applications, it may be desirable to fixedly couple the valve 10 to the conduit by using welds. Welding the valve 10 to the conduit may reduce weight, create stronger connections, and define a substantially leak-proof passage. Accordingly, the weld end valve body 14 may be used to provide a fixed connection. The weld end valve body 14 is capable of withstanding the heat generated during welding and may be capable of meeting ISO 14313 (pipeline valves) and ISO 14723 (subsea pipeline valves) specifications. Indeed, all of the valve bodies 12, 14, and 16 may be capable of meeting a variety of valve-related ISO, ANSI, API, ASME, and/or NACE specifications, including subsea specifications. Further, it is to be understood that other valve bodies may be used, including valve bodies that combine flanged ends, weld ends, and/or hub ends. That is, the valve body may include a flange end at one end of the valve body and a hub end at the opposite end.

Figure 2:
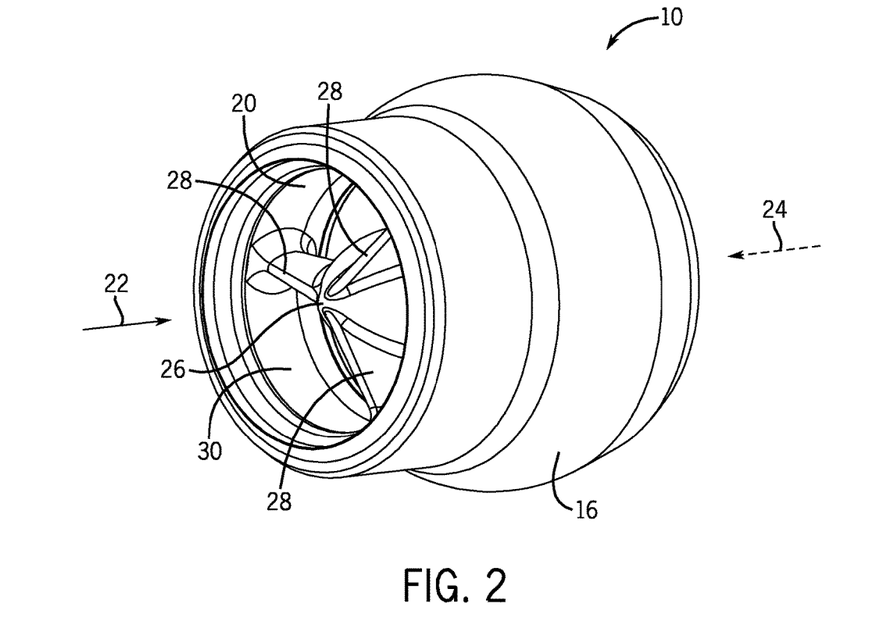
FIG. 2 is a perspective frontal view of a nozzle check valve, including a nozzle, in accordance with one embodiment of the disclosure.

FIG. 2 depicts a perspective view of the front end of the nozzle check valve 10, including a nozzle 20. The figure is illustrative of the ability of the nozzle check valve 10 to enable a flow in an axial forward direction 22 (i.e., forward flow) and to prevent a flow in a backward direction 24 (i.e., backward flow). The forward flow 22 may be driven, for example, by a pump, a compressor, or any other device capable of creating a movement of a fluid through the nozzle 20. In one embodiment, the nozzle 20 includes a dome-shape center 26 with three airfoils 28 attached to a barrel 30. In certain embodiments, the nozzle 20 is manufactured as one part, that is, the dome-shape center 26, the airfoils 28, and the barrel 30 may all be forged, cast and/or milled out of the same billet so as to result in the nozzle 20 having no welds, rivets, or other fasteners. Accordingly, the dome-shape center 26 and airfoils 28 are capable of defining a smooth flow path through the inside walls of the barrel 30 that may exhibit a substantially low pressure drop as the fluid passes through the nozzle 20 and into the remainder of the valve body 16. Indeed, the nozzle 20 may improve the forward fluid flow through the check valve 10. It is to be understood that in other embodiments, the nozzle 20 may include more or less airfoils 28, and may be manufactured as separate parts that may then be welded together. As mentioned above, the nozzle 20 may also be a component that may be manufactured separate from the valve body 16. Indeed, all or substantially all other valve 10 components may be components manufactured separate from the valve body 16, as described in more detail with respect to FIG. 3 below.

Figure 3:
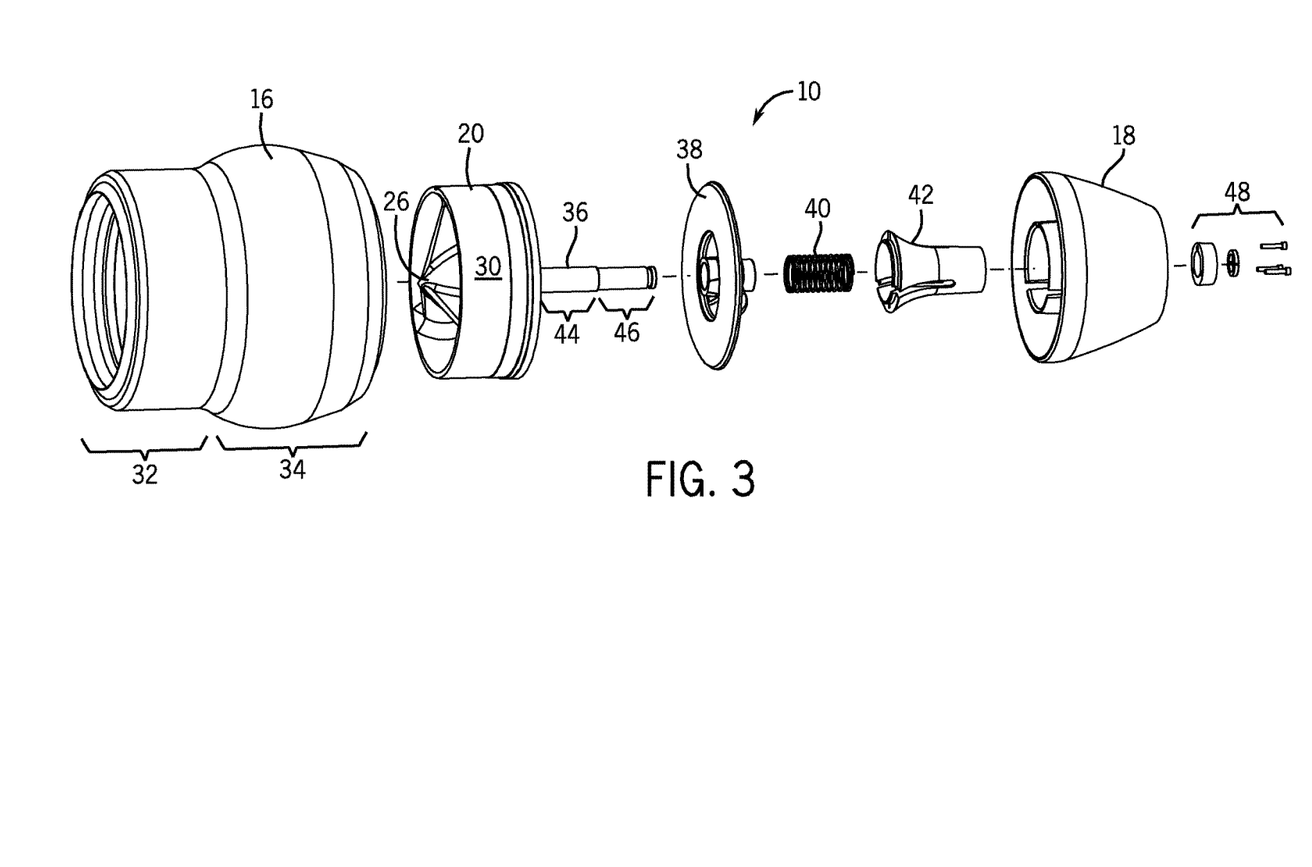
FIG. 3 is an exploded perspective side-view of components of a nozzle check valve, in accordance with one embodiment of the disclosure.

FIG. 3 illustrates an exploded perspective side view of an embodiment of the nozzle check valve 10 including a plurality of valve 10 components. In the illustrated embodiment, the valve body 16 includes a section 32 and a section 34. The section 32 has a smaller interior diameter than an interior diameter of the section 34. The interior inner diameter and length of the section 32 is suitable for allowing the insertion of the barrel 30 of the nozzle 20 inside of the section 32. Once positioned inside the valve body 16, the nozzle 20 may be secured by using any number of fastener features such as an interference fit, lock rings, bolts, screws, welds, pins, or a combination thereof. In certain embodiments, the design of the valve body may include mechanical stop features aiding in the fastening of the nozzle 20 to the valve body 16. For example, the nozzle 20 may encounter a protrusion in the valve body 16 that prevents axial movement of the nozzle 20 with respect to the valve body 16. Such a mechanical stop feature may be located downstream of the forward flow, thus aiding in the retention of the nozzle 20, even during high forward flow conditions. A similar mechanical stop feature may be located upstream of the forward flow, thus aiding in the retention of the nozzle during high reverse flow conditions. In the illustrated embodiment, the nozzle 20 includes a shaft 36 concentrically or co-axially positioned in the approximate axial center of the nozzle 20, at the rear of the nozzle 20. Accordingly, the shaft 36 protrudes from the rear of the nozzle 20 and into the section 34 of the valve body 16 when the nozzle 20 is positioned inside of the section 32.

The shaft 36 may be suitable for concentrically and/or co-axially positioning other valve 10 components, such as an annular or toroidal disc 38, a coil spring 40, and a spacer 42, inside of the valve body 16. Accordingly, a section 44 of the shaft 36 may be of a length and an outer diameter adequate for accommodating the toroidal disc 38, coil spring 40, and spacer 42 as the aforementioned components are "slid" axially onto the section 44 of the shaft 36. A remainder section 46 of the shaft 36 may be of a length and an outer diameter adequate for insertion into the diffuser 18. Additionally, the diffuser 18 may include a length and an outer diameter suitable for inserting the diffuser 18 into the section 34 of the valve body 16. Once the valve 10 components have been positioned inside the valve body 16, a locking assembly 48 may then be used to securely couple the shaft 36 to the diffuser 18 and valve body 16, locking all valve components securely in place. Such a modular valve 10 design allows for the straightforward reconfiguration and/or replacement of substantially all of the valve 10 components.

The check valve 10 may be delivered as a kit so as to be reconfigured in the field. That is, the check valve 10 may include surplus components, such as multiple spacers 42 of different sizes and shapes, that allow an operator to reconfigure the valve in the field to better accommodate different operational environments and specifications. Indeed, the locking assembly 48 may be removed in the field so as to allow access to the inside of the valve 10, as described in more detail below with respect to FIG. 4.

Figure 4:
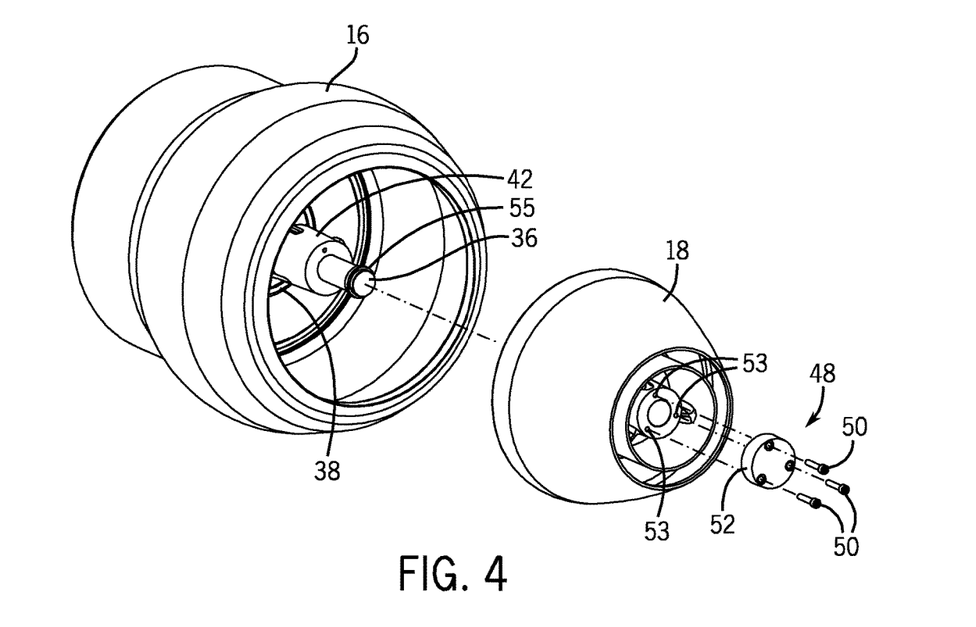
FIG. 4 is an exploded perspective rear view of a nozzle check valve, including a diffuser, in accordance with one embodiment of the disclosure.

FIG. 4 is illustrative of an embodiment of the locking assembly 48 that may be useful in providing easy access to the valve 10 components. In the depicted embodiment, the locking assembly 48 includes three bolts 50 and a locking cap 52. It is to be understood that in other embodiments, more or less bolts may be used. The bolts 50 may be of any type, including torx bolts, security torx bolts, hex bolts, Robertson bolts, and so forth, capable of securing the locking cap 52 to the diffuser 18. Accordingly, the diffuser 18 may include threaded openings 53 adequate for engaging the bolts 50 and securing the bolts 50 in place. In certain embodiments, the rear end of the shaft 36 may also include a retaining ring 55 suitable securing the nozzle 20 to the diffuser 18. In other embodiments, the shaft 36 may be secured to the diffuser by using any number of fasteners, such as retaining pins, bolts, screws, or a combination thereof. Further, the bolts, including the bolts 50 used to secure the locking cap 52, are not structural bolts. That is, the bolts are not used to structurally secure the valve 10, and thus, are capable of withstanding vibration, thermal changes, and so forth. Such abilities, among others, allow the valve 10 to be substantially maintenance-free.

A field technician or engineer may use tools such as a hex wrench to remove the bolts 50, uncouple the locking cap 52, remove the retaining ring 55, and subsequently remove the diffuser 18. The removal of the diffuser 18 allows access to the valve 10 components, as illustrated. Accordingly, components such as the spacer 42, the disc 38, and so on, may be removed and replaced so as to reconfigure the valve 10 to meet specific operational parameters such as flow rate, pressure drop, and/or other parameters. Indeed, components such as the disc 38 and the spacer 42 may include features capable of providing for an improved fluid flow volume, fast closing times, and low pressure drops. Additionally, the diffuser 18 includes a shape, for example, an airfoil shape, that optimizes the fluid flow through the valve body. Such as a shape may be designed to minimize or eliminate recirculation zones that result in reduced fluid flows and/or pressure buildups.

Figure 5:
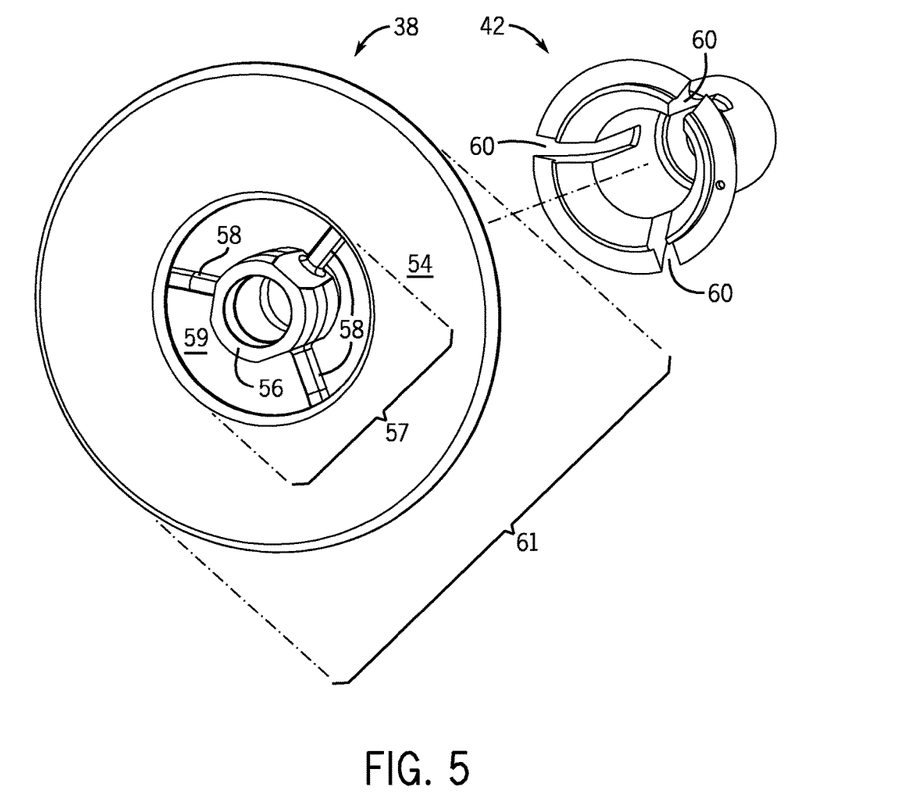
FIG. 5 is an exploded perspective frontal view of an annular disc and a spacer, in accordance with one embodiment of the disclosure.
Figure 6:
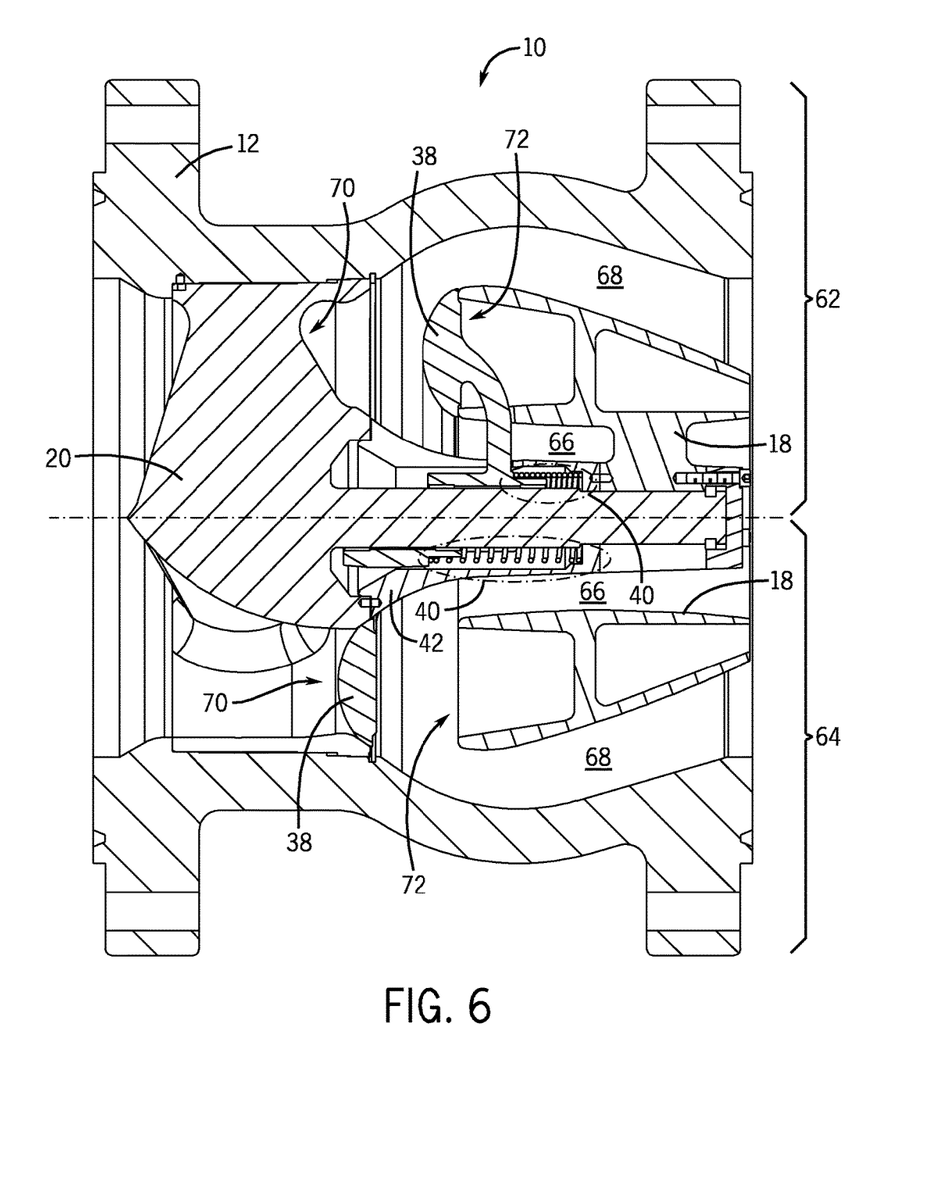
FIG. 6 is a cross-sectional side view of an embodiment of a nozzle check valve.

FIG. 5 is an exploded perspective frontal view of an embodiment of the annular disc 38 and the spacer 42 capable of improved fluid flow volume, fast closing times, and low pressure drops. In the depicted embodiment, the annular disc 38 includes a toroidal ring 54 that is co-axially or concentrically coupled to a barrel 56 through the use of three radial arms 58. The front side of the toroidal ring 54 is curved, as depicted in FIG. 6, while the rear side of the toroidal ring 54 may be flat. It is to be understood that in other embodiments, more or less radial arms 58 may also be used to support the barrel 56. The toroidal ring 54 defines an opening 59 (e.g., three sections defining an annular opening) through the center of the disc 38. The opening 59 in the center of the disc 38 may be of a diameter 57 sized between approximately 10%-20%, 15%-50%, 40%-90% of the outer diameter 61 of the disc 38.

The opening 59 is configured to improve fluid flow through the valve 10. That is, the annular disc 38 allows at least two flows, a first flow is capable of passing through the annular opening 59 of the annular disc 38, and a second flow is capable of passing around the circumference of the annular disc 38, as depicted in more detail in FIG. 6. Further, the curved surface on the front face of the toroidal ring 54 allows for a smoother flow both through the annular opening 59 as well as around the circumference of the annular disc 38. Accordingly, the annular disc 38 is capable of a much improved flow volume because of an increase in internal flow volume due to using a plurality of flow passages as well as a design that decreases resistance to the fluid flow.

As further illustrated in FIG. 5, an embodiment of the spacer 42 is exploded from the annular disc 38. In the illustrated embodiment, the spacer 42 includes three slots 60. Each of the slots 60 is suitable for allowing the insertion of a radial arm 58 of the annular disc 38. That is, the barrel 56 of the annular disc 38 may be inserted into approximately the center of the spacer 42 such that the radial arms 58 are inserted into the slots 60. Once the radial arms 58 are positioned in the slots 60, the annular disc 38 may be secured from rotating in a circumferential direction (i.e., "anti-rotation"). However, the slots 60 allow the annular disc 38 to move in an axial direction inwardly towards the rear of the spacer 42 and outwardly away from the rear of the spacer 42 and towards the front of the spacer 42. Such axial movement relative to the valve body 12, 14, 16 is capable of opening or closing the valve 10, as described in more detail below with respect to FIG. 6.

The spacer 42 may be replaced, for example, to accommodate different types of flow conditions. Indeed, the spacer 42 may be replaced in the field with a spacer 42 having a body that is shaped differently, for example, by having a smaller or larger outer body diameter, and/or smaller or larger body length. Additionally, the spacer 42 may be replaced with a spacer 42 having slots 60 shorter or longer in length, allowing for easy reconfiguration of the length of travel of the annular disc 38. As an example, for lower flow volume applications, increasing the outer diameter of the spacer 42 may result in more of the fluid flow impacting the toroidal ring 54, causing a faster opening of the valve 10. In another example, for heavy flow applications, decreasing the outer diameter of the spacer 42 may allow for a faster flow through the annular disc 38. Accordingly, a plurality of spacers 42 may be delivered as part of a valve 10 kit. The field technician may thus quickly reconfigure the valve 10 for specific application by replacing components, such as the spacer 42, more suitable to the specific application. For example, a first spacer 42 may be designed for low to medium flow volumes, a second spacer 42 may be designed for medium to high flow volumes, a third spacer 42 may be designed for low flow volumes, a fourth spacer 42 may be designed for medium flow volumes, and a fifth spacer 42 may be designed for high flow volumes.

FIG. 6, is a cross-sectional view of an embodiment of the check valve 10. In the depicted embodiment, the upper half 62 of the figure illustrates the check valve 10 in an open position, while, for comparison purposes, the lower half 64 of the figure illustrates the check valve 10 in a closed position. As mentioned above, the check valve 10 is capable of an improved flow and a reduced pressure loss. That is, the check valve 10 is able to allow for a substantially greater flow volume while minimizing any pressure or hydraulic loss experienced as the flow passes through the check valve 10. Indeed, in certain embodiments, the pressure loss coefficient (i.e., K value) may be less than approximately 0.5. Indeed, features such as a plurality of flow passages 66, 68 may result in an improved fluid flow and a reduced pressure loss coefficient.

In one embodiment, the first flow passage 66 is an annular or toroidal flow passage having the spacer 42 in the approximate center of the flow passage 66 with the outer walls of the spacer 42 defining the inner circumference of the flow passage 66. The outer circumference of the flow passage 66 may then be defined by the inner walls of the diffuser 18. In this embodiment, the second annular flow passage 68 is concentrically or co-axially positioned to surround the first flow passage 66. The inner circumference of the second annular flow passage 68 may be defined by the outside walls of the diffuser 18, and the outer circumference of the second annular flow passage 68 may be defined by the inner walls of the flanged valve body 12. By combining the use of a plurality of flow passages 66 and 68, the check valve 10 may substantially increase the amount of fluid flow through the check valve 10 while simultaneously reducing the pressure loss experienced because the fluid flow may be capable of an improved flow volume and lower flow speed.

The annular disc 38 is capable of a quick dynamic response in both the opening and the closing of the flow passages 66, 68. A quick dynamic response (i.e., fast opening and fast closing action) may allow the check valve 10 to prevent a set of conditions know as "slam." If a valve does not close rapidly to prevent backward flow, an undesirable high pressure surge know as "hammer" may form on sudden shut-off of the valve, which may then "slam" the valve's disc against a valve seat 70. The check valve 10 includes several features that allow for a no-slam performance. For example, the annular disc 38 is lightweight at least partially due to the reduction of mass accomplished by having an open center portion 59, as shown in FIG. 5. Indeed, weight savings of 50% or more may be possible with the annular disc 38 design. Accordingly, the reduction in mass allows the annular disc 38 to move more quickly in both opening and closing modalities. The annular disc 38 may be manufactured out of stainless steel, titanium, aluminum, austenitic nickel-chromium-based superalloys, and so forth.

Further, the distance between the open and closed positions of the annular disc 38 may be less than approximately 2, 5, 10, 50, 100 millimeters. Such small closure distances improve the closure speed because the annular disc 38 may not have to move very far from a completely open position to a completely closed position, and vice versa. Additionally, the closure speed in any orientation (e.g., horizontal orientation, vertical orientation, angled orientation) may be improved by the use of the spring 40. The spring 40, as illustrated, is in a compressive state when the check valve 10 is in an open position (e.g., during forward flow). Accordingly, when the forward flow stops, the spring aids the movement of the annular disc 38 by propelling the annular disc 38 into the valve seat 70, thus closing the check valve 10. The check valve 10 may also include other features such as low-friction bearings (e.g., bearings with low friction coating) that may decrease friction of moving components, even further increasing the no-slam capabilities of the check valve 10. Indeed, the combined effect of such features is to virtually eliminate hammers and slams.

Likewise, the speed of the opening of the check valve 10 may be considerably improved by the use of the features disclosed herein. During forward flow, the forward flowing fluid impinges upon the annular disc 38. The pressure of the flowing fluid against the annular disc 38 is sufficient to overcome the compressive force exerted by the spring 40. Accordingly, the annular disc 38 may be pushed by the forward flow away form the seat 70 to an open valve position. The fluid may then flow around the outside circumference of the annular disc 38 (i.e., through flow passage 68), and also through the center portion of the annular disc 38 (i.e., through flow passage 66). The annular disc 38 may be moved by a sufficient force of the forward fluid flow until it becomes seated at a valve seat 72 in a fully open position. As mentioned above, the annular disc 38 is lightweight, which allows less fluid pressure to move the annular disc 38. Additionally, the annular disc 38 may be stabilized by the radial arms 58 positioned inside the spacer slots 60. Accordingly, the pressure exerted by the forward flow is directed more towards moving the annular disc 38 axially and not towards "spinning" the annular disc 38. In other words, the annular disc 38 may translate (i.e., move axially without rotation) between open and closed positions.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A nozzle check valve comprising:
a valve body;
a nozzle coupled to an interior of the valve body, the nozzle comprising a first barrel and a shaft, wherein the first barrel surrounds the shaft and the first barrel and the shaft are one-piece;
an annular disc disposed in the interior of the valve body, wherein the annular disc comprises a second barrel, a disc portion disposed about the second barrel, a central opening disposed between the second barrel and the disc portion, and a plurality of radial arms extending between the disc portion and the second barrel;
a spacer removably coupled to the annular disc, wherein the spacer comprises a tapered annular portion;
a diffuser disposed at least partially inside the valve body, wherein the diffuser is configured to directly couple to the shaft, removably couple to the shaft, and removably couple to the nozzle check valve; and
a first fluid passage in fluid communication with the annular disc, wherein the annular disc is configured to move in an axial direction relative to the valve body to open and close the first fluid passage.

2. The nozzle check valve of claim 1, wherein the valve body is removable from the nozzle.

3. The nozzle check valve of claim 1, comprising a locking assembly capable of coupling with the diffuser to secure access to valve components inside of the diffuser and valve body.

4. The nozzle check valve of claim 1, wherein the plurality of radial arms comprises three radial arms.

5. The nozzle check valve of claim 1, wherein the spacer is disposed about the second barrel.

6. The nozzle check valve of claim 1, comprising at least one anti-rotational feature wherein the at least one anti-rotation feature comprises a radial arm disposed in an axial slot.

7. The nozzle check valve of claim 1, wherein the spacer is coupled to the annular disc via at least one anti-rotation feature comprising the plurality of radial arms disposed in a respective plurality of slots extending in the axial direction.

8. The nozzle check valve of claim 1, comprising a second fluid passage in fluid communication with the annular disc, wherein the annular disc is configured to move in the axial direction relative to the valve body to open or close the second fluid passage.

9. The nozzle check valve of claim 8, wherein the central opening is configured to enable flow through the first fluid passage.

10. The nozzle check valve of claim 8, wherein the first fluid passage extends through the diffuser, and the second fluid passage extends between the valve body and the diffuser.

11. The nozzle check valve of claim 1, wherein the shaft of the nozzle is disposed in an axial bore of the second barrel, wherein the spacer is disposed about the shaft and the second barrel.

12. The nozzle check valve of claim 11, comprising a spring disposed about the shaft between the annular disc and the spacer.

13. The nozzle check valve of claim 12, wherein the diffuser is disposed about the shaft, the first fluid passage extends through the diffuser, and a second fluid passage extends between the diffuser and the valve body.

14. A check valve kit comprising:
- a valve body comprising a first fluid flow passage and a second fluid flow passage co-axial to the first fluid flow passage;
- an annular disc positioned internally in the valve body, wherein the annular disc is capable of opening and closing both the first and the second fluid flow passages;
- a spring configured to bias the annular disc into a closed position;
- a spacer, the spacer defines a cavity that receives the spring, the spacer is configured to couple with the annular disc via an anti-rotation feature comprising a radial arm disposed in a slot; and
- a diffuser removably disposed at least partially inside the valve body.

15. The check valve kit of claim 14, wherein the annular disc comprises a disc portion disposed about a barrel, and the spacer is disposed about the barrel.

16. The check valve kit of claim 14, comprising a locking assembly having one or more removable fasteners configured to removably secure the diffuser.

17. A nozzle check valve comprising:
- a valve body;
- a nozzle coupled to an interior of the valve body, the nozzle comprising a barrel and a shaft;
- an annular disc disposed in the interior of the valve body;
- a spacer removably coupled to the annular disc;
- a diffuser removably disposed at least partially inside the valve body, the diffuser defines a cavity that receives the spacer and the shaft; and
- a first fluid passage in fluid communication with the annular disc and extending through the diffuser; and
- a second fluid passage in fluid communication with the annular disc and extending between the valve body and the diffuser, wherein the annular disc is configured to move in an axial direction relative to the valve body to open and close the first and second fluid passages.

18. The nozzle check valve of claim 17, wherein the diffuser is removably coupled to the nozzle check valve via one or more removable fasteners.

* * * * *